United States Patent
Hao et al.

(10) Patent No.: US 12,501,037 B2
(45) Date of Patent: Dec. 16, 2025

(54) TILE ENCODING BITRATE ALLOCATION FOR LOW-LATENCY VIDEO COMMUNICATION SYSTEMS

(71) Applicant: Agora Lab, Inc., Santa Clara, CA (US)

(72) Inventors: Mingyue Hao, Shanghai (CN); Zesen Zhuang, Shanghai (CN); Sheng Zhong, Santa Clara, CA (US)

(73) Assignee: Agora Lab, Inc., Santa Clara, CA (US)

( * ) Notice: Subject to any disclaimer, the term of this patent is extended or adjusted under 35 U.S.C. 154(b) by 140 days.

(21) Appl. No.: 18/404,329

(22) Filed: Jan. 4, 2024

(65) Prior Publication Data

US 2025/0227229 A1    Jul. 10, 2025

(51) Int. Cl.
*H04N 19/115*    (2014.01)
*H04N 19/154*    (2014.01)
*H04N 19/176*    (2014.01)
*H04N 19/192*    (2014.01)

(52) U.S. Cl.
CPC ......... *H04N 19/115* (2014.11); *H04N 19/154* (2014.11); *H04N 19/176* (2014.11); *H04N 19/192* (2014.11)

(58) Field of Classification Search
None
See application file for complete search history.

(56) References Cited

U.S. PATENT DOCUMENTS

2019/0281318 A1*  9/2019  Han ..................... H04N 19/174
2019/0387224 A1* 12/2019  Phillips ................ H04N 19/177

OTHER PUBLICATIONS

Yixuan Ban et al.; An Optimal Spatial-temporal Smoothness Approach for Tile-based 360-degree Video Streaming; 2017; IEEE Visual Communications and Image Processing; pp. 1-4.
Abid Yaqoob et al.; Dynamic Viewport Selection-Based Prioritized Bitrate Adaptation for Tile-Based 360 Video Streaming; 2022; IEEE Acess; vol. 10; pp. 29377-29392.

\* cited by examiner

*Primary Examiner* — Samuel D Fereja
(74) *Attorney, Agent, or Firm* — Young Basile Hanlon & MacFarlane, P.C.

(57) ABSTRACT

A method for allocating bitrate in video communications is disclosed. The method includes encoding, via an encoder, a video stream that is partitioned into tiles associated with a viewing angle of the video stream, whereby encoding the video stream includes allocating each of the tiles a bitrate. The method also includes determining an image quality score associated with rendering of the tiles at a first iteration, whereby rendering of the tiles includes decoding and displaying the tiles at the first iteration in the viewing angle of the video stream with the bitrate. The method further includes, responsive to determining the image quality score, modifying the bitrate allocated to at least some of the tiles such that rendering of the tiles at a second iteration that is after the first iteration includes decoding and displaying the tiles with the modified bitrate.

20 Claims, 7 Drawing Sheets

TILE ENCODING BITRATE ALLOCATION FOR LOW-LATENCY VIDEO COMMUNICATION SYSTEMS

TECHNICAL FIELD

This disclosure relates to video coding and transmission, and in particular to a real-time video communication system.

BACKGROUND

Video quality is an important aspect of real-time multimedia communications systems. In such systems, video data can be transmitted through a network (e.g., the Internet) between a sending device and a receiving device, such as mobile phones and personal computers. Objective-based metrics may often be used to evaluate and control the video quality during network transmission. For example, the objective-based metrics may often be or may include a peak signal-to-noise ratio (PSNR) and a structured similarity (SSIM).

Video quality may be impaired by various network inconsistencies, such as low network transmission speed, connectivity issues, and network "traffic." That is, an unstable network bandwidth may negatively impact the video quality during network transmission. Video encoders may adapt their encoding schemes and parameters (e.g., a video encoding bitrate, a frame rate, and/or a picture resolution) to the varying network conditions, which may result in video quality fluctuations. Such fluctuations may ultimately affect user experiences in the real-time multimedia communication systems.

SUMMARY

In one aspect, a method for allocating bitrate in video communications is disclosed. The method includes encoding, via an encoder, a video stream that is partitioned into tiles associated with a viewing angle of the video stream, whereby encoding the video stream includes allocating each of the tiles a bitrate. The method also includes determining an image quality score associated with rendering of the tiles at a first iteration, whereby rendering of the tiles includes decoding and displaying the tiles at the first iteration in the viewing angle of the video stream with the bitrate. The method further includes, responsive to determining the image quality score, modifying the bitrate allocated to at least some of the tiles such that rendering of the tiles at a second iteration that is after the first iteration includes decoding and displaying the tiles with the modified bitrate.

In another aspect, a device for allocating bitrate in video communications is disclosed. The device includes a non-transitory memory and a processor configured to execute instructions stored in the non-transitory memory. The instructions stored in the non-transitory memory include instructions to encode a video stream that is partitioned into tiles associated with a viewing angle of the video stream, whereby encoding the video stream includes allocating each of the tiles a bitrate. The instructions stored in the non-transitory memory also include instructions to determine an image quality score associated with rendering of the tiles at a first iteration, whereby rendering of the tiles includes decoding and displaying the tiles at the first iteration in the viewing angle of the video stream with the bitrate. The instructions stored in the non-transitory memory further include, responsive to determining the image quality score, modify the bitrate allocated to at least some of the tiles such that rendering of the tiles at a second iteration that is after the first iteration includes decoding and displaying the tiles with the modified bitrate.

In another aspect, a non-transitory computer-readable storage medium is disclosed. The non-transitory computer-readable storage medium is configured to store computer programs for allocating bitrate in video communications. The computer programs include instructions executable by a processor to encode a video stream that is partitioned into tiles associated with a viewing angle of the video stream, whereby encoding the video stream includes allocating each of the tiles a bitrate. The computer programs also include instructions executable by the processor to determine an image quality score associated with rendering of the tiles at a first iteration, whereby rendering of the tiles includes decoding and displaying the tiles at the first iteration in the viewing angle of the video stream with the bitrate. The computer programs further include instructions executable by the processor to, responsive to determining the image quality score, modify the bitrate allocated to at least some of the tiles such that rendering of the tiles at a second iteration that is after the first iteration includes decoding and displaying the tiles with the modified bitrate.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
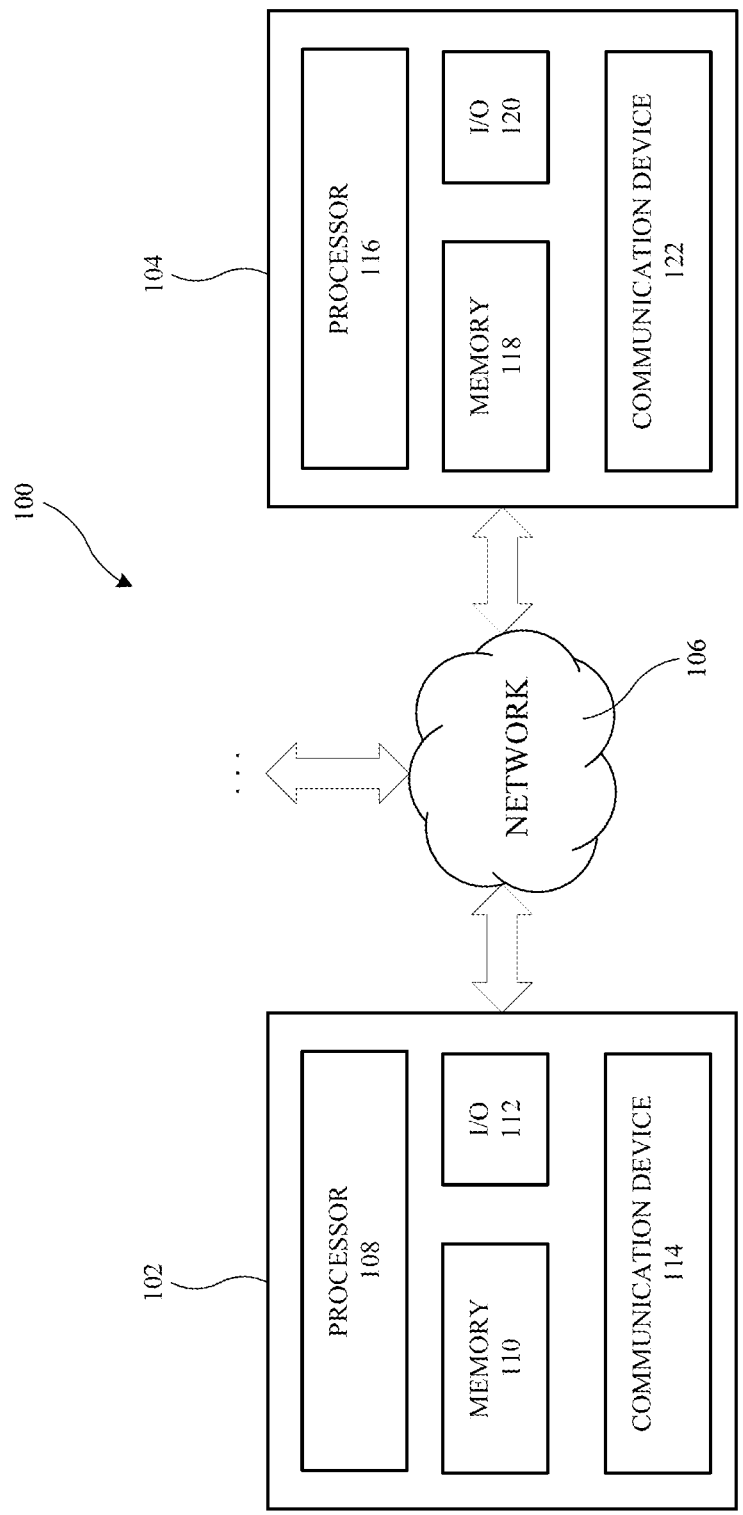
FIG. 1 is a diagram of an example of a system for media transmission.

A video communication system may include a sender (i.e., a sending device) and a receiver (i.e., a receiving device). The sender may perform at least some of the steps of video capturing, video warping or stitching, video encoding, and video transmission. In an example, the sender may be a client device that is capturing and transmitting (e.g., streaming) a video in real-time to one or more receivers. In another example, the sender may be a streaming server, which may receive a real-time video or a pre-recorded video to be streamed to one or more receivers. The receiver may perform the steps of video decoding, video de-warping, and rendering. The sender and the receiver may communicate over a network. That is, encoded video data may be transmitted from the sender to the receiver over the network. The video data may be transmitted from the sender to the receiver via multiple servers of the network.

The video captured may be a wide-angle video The video may be composed of temporally arranged images. An image of the video may be the output of the stitching operation of all of the constituent pictures, which may also be referred to as faces or facets, obtained by, for example, multiple cameras of a wide-angle capture device. To illustrate, a wide-angle video may be captured using a 6-camera device where the cameras may be arranged in a cube shape and have, collectively, a field of view (FOV) up to and including a 3600 FOV. Each of the cameras may have an FOV (e.g., 120°) in a longitudinal dimension and another FOV (e.g., 90°) in a latitudinal dimension. As such, the FOV of any one of the cameras may overlap the FOVs of some of the other cameras. The overlap areas can be used in the stitching operation to create the overall wide-angle video.

Different techniques are known for encoding and decoding wide-angle videos. For example, wide-angle videos may be encoded/decoded using techniques described in or similar to the scalable video coding extension to HEVC (SHVC) of the Joint Collaborative Team on Video Coding (JCT-VC) of ITU-T SG16 WP3 and ISO/IEC JTC1/SC29/WG11. However, other techniques are possible. For example, encoding images of the wide-angle video may include partitioning the images into tiles. Each tile (i.e., a sequence in time of the tile) may be encoded as a separate compressed bitstream (referred to herein as a "compressed tile stream" or simply a "tile stream." To illustrate, and without limitations, each of the images of the wide-angle video may be an 8K image (i.e., 7,680×4,320 pixels) that is partitioned into 720p tiles (i.e., 1280×720 pixels per tile). Using the nomenclature of an H.264, as a non-limiting example, the sequence of tiles may be grouped where each group is encoded/decoded according to a coding structure, such as IBBPBB, where I means an intra-predicted tile, P means that the tile is predicted using a previous in-time tile, and B means that the tile is predicted using both a previous and forward tile.

As mentioned above, a viewer may watch only a portion of a wide-angle video at any one time. That is, the viewer may be able to watch only part of the whole imaged scene at any one time. The area that the viewer can or is interested in viewing is a "viewport." The viewport can be said to be encompassed by, or included in, a region of interest (ROI). As such, an ROI, as used herein, refers to the tiles of an image of a wide-angle video within which the viewport is included.

The viewer may change the viewport at any point in time. To illustrate, and without limitations, the viewer may be watching, using a receiving device (e.g., a handheld device, a head mounted device, or any other device that is capable of rendering a wide-angle video), the video stream of a runner that is traversing the scene from left to right. Thus, the viewer may move the viewport to the right as the runner moves to the right. In another example, while the viewer is following the runner, the viewer hears the sounds of low-flying airplanes and causes the receiving device to change the viewing angle by pointing the device upwards so that the viewer can see the airplanes. Typically, the wide-angle video communication system may include a viewpoint prediction function that anticipates which tiles the receiving device will require in the near future (e.g., in 1, 2, 3 seconds or some future time).

In conventional wide-angle video communication systems, the sender may encode and transmit a complete image (e.g., a complete image in ERP format), and the receiver may receive and decode the image at the original capture quality even though the viewer is not capable of viewing all such data at any one time. Transmitting (e.g., broadcasting) and receiving the whole of a wide-angle video at the high quality consumes a significant amount of bandwidth. However, such bandwidth consumption is unnecessary, and is therefore wasteful since, as already mentioned, a viewer cannot view the whole of a wide-angle video. Additionally, encoding whole frames of a wide-angle video may consume unnecessary compute resources at the encoder (i.e., the sender) therewith degrading the performance of the sender, especially in real-time applications. Similarly, decoding whole frames of a wide-angle video may consume unnecessary compute resources at the receiver (i.e., the decoder) therewith degrading the viewing (e.g., display) performance at the receiver, especially in real-time applications.

Some other conventional wide-angle video communication systems may use layered encoding/decoding where the wide-angle video may be encoded into a base layer and one or more enhancement layers. The base layer can be used to encode, at a lower quality, the whole (i.e., all the images) of the wide-angle video. The base layer can include or be a down-sampled version of the wide-angle video. The enhancement layer can include different tiles partitioned from the original wide-angle video and encoded with a higher total bitrate and resolution than the original resolution of the wide-angle video. The receiver (e.g., a decoder of the receiving device) can always decode the base layer data and then decode, by adaptively requesting the enhancement layer data, data (i.e., encoded data of tiles) corresponding to a current viewport.

Such techniques can save bandwidth compared to sending (e.g., from the sender) a complete, high-quality wide-angle image. However, in such techniques, different tiles may be independently encoded and transmitted, and then displayed by the receiver after stitching and re-mapping of the tiles. Due to different image complexity and locations within the viewport among the tiles, if the encoding bitrate of each tile is not reasonably allocated, the image quality after reconstruction may be very poor. Therefore, inconsistent image quality and visible tile boundaries within the reconstructed image may occur.

Additionally, current tile-based wide-angle transmissions are frequently streaming-based solutions, in which the server may pre-store future encoded contents (e.g., images). Using such a technique, future quality-rate information for different tiles may be obtained in advance to help effectively allocate bitrates to each tile. However, such a technique may not be latency-friendly, whereby the pre-stored future encoded contents may require a delay in streaming (i.e., transmission) of several seconds or even minutes. As a result, such a technique may be unable to meet the requirements of a stricter latency limit (e.g., instant encoding and transmitting, such as in real-time applications), whereby the quality-to-rate ratio of each future tile cannot be obtained in advance when determining the transmission bitrate.

Implementations according to this disclosure can reduce network bandwidth consumption of a network and the processing power consumption of the receiving and sending devices in addition to improving the viewing experience at the receiver. Dynamic bitrate allocation may be performed at the sender and/or the receiver to actively allocate bitrates to each of the tiles based upon past tile image quality. For example, an initial image of the wide-angle video may be partitioned into tiles, whereby each of the tiles may be allocated an initial bitrate. The sender may encode the tiles and transmit the tiles to the receiver for rendering (e.g., decoding and/or displaying the image). The sender and/or the receiver may evaluate the quality of the rendered image to determine if the bitrates allocated to the tiles require adjustment. That is, based upon the quality of the rendered image, the sender may reallocate bitrates to at least some of the tiles to for future renderings (i.e., rendering of a subsequent image of the wide-angle video at time after rendering of the initial image). As a result, a total bitrate quota (i.e., capacity) based on network bandwidth consumption of a network and/or the processing power consumption of the receiving and sending devices may be reallocated to the tiles to improve the image quality, thereby improving the user's viewing experience of the wide-angle video.

To describe some implementations in greater detail, reference is first made to examples of hardware and software structures used to implement a real-time wide-angle video communication system. It should be noted that the teachings herein are not limited to real-time wide-angle video communication systems and the real-time wide-angle communication systems described herein are intended for illustrative purposes only due to their typical strain on network bandwidth consumption of a network. As such, the teachings herein may be implemented with any video communication system.

FIG. 1 is a diagram of an example of a system 100 for media transmission, including the transmission of real-time wide-angle video. As shown in FIG. 1, the system 100 may include multiple apparatuses and networks, such as an apparatus 102, an apparatus 104, and a network 106. The apparatuses may be implemented by any configuration of one or more computers, such as a microcomputer, a mainframe computer, a supercomputer, a general-purpose computer, a special-purpose/dedicated computer, an integrated computer, a database computer, a remote server computer, a personal computer, a laptop computer, a tablet computer, a cell phone, a personal data assistant (PDA), a wearable computing device, or a computing service provided by a computing service provider (e.g., a web host or a cloud service provider). In some implementations, an apparatus may be implemented in the form of multiple groups of computers that are at different geographic locations and may communicate with one another, such as by way of a network. While certain operations may be shared by multiple computers, in some implementations, different computers may be assigned to different operations. In some implementations, the system 100 may be implemented using general-purpose computers/processors with a computer program that, when executed, carries out any of the respective techniques, algorithms, and/or instructions described herein. In addition, or alternatively, for example, special-purpose computers/processors including specialized hardware may be utilized for carrying out any of the methods, algorithms, or instructions described herein.

The apparatus 102 may have an internal configuration of hardware including a processor 108 and a memory 110. The processor 108 may be any type of device or devices capable of manipulating or processing information. In some implementations, the processor 108 may include a central processor (e.g., a central processing unit or CPU). In some implementations, the processor 108 may include a graphics processor (e.g., a graphics processing unit or GPU). Although the examples herein may be practiced with a single processor as shown, advantages in speed and efficiency may be achieved using more than one processor. For example, the processor 108 may be distributed across multiple machines or devices (each machine or device having one or more processors) that may be coupled directly or connected via a network (e.g., a local area network).

The memory 110 may include any transitory or non-transitory device or devices capable of storing codes (e.g., instructions) and data that may be accessed by the processor (e.g., via a bus). The memory 110 may be a random-access memory (RAM) device, a read-only memory (ROM) device, an optical/magnetic disc, a hard drive, a solid-state drive, a flash drive, a security digital (SD) card, a memory stick, a compact flash (CF) card, or any combination of any suitable type of storage device. In some implementations, the memory 110 may be distributed across multiple machines or devices, such as in the case of a network-based memory or cloud-based memory. The memory 110 may include data (not shown), an operating system (not shown), and one or more applications (not shown). The data may include any data for processing (e.g., an audio stream, a wide-angle video stream, or a multimedia stream). At least one of the applications may include programs that permit the processor 108 to implement instructions to generate control signals for performing functions of the techniques in the following description. For example, when functioning as a sender, the applications may include instructions for performing at least the technique described with respect to FIG. 6.

In some implementations, in addition to the processor 108 and the memory 110, the apparatus 102 may also include a secondary (e.g., external) storage device (not shown). The secondary storage device may be a storage device in the form of any suitable non-transitory computer-readable medium, such as a memory card, a hard disk drive, a solid-state drive, a flash drive, or an optical drive. Further, the secondary storage device may be a component of the apparatus 102 or may be a shared device accessible via a network. In some implementations, the application in the memory 110 may be stored in whole or in part in the secondary storage device and loaded into the memory 110 as needed for processing.

The apparatus 102 may include input/output (I/O) devices. For example, the apparatus 102 may include an I/O device 112. The I/O device 112 may be implemented in various ways, for example, it may be a display that can be coupled to the apparatus 102 and configured to display a rendering of graphics data. The I/O device 112 may be any device capable of transmitting a visual, acoustic, or tactile signal to a user, such as a display, a touch-sensitive device (e.g., a touchscreen), a speaker, an earphone, a light-emitting diode (LED) indicator, or a vibration motor. The I/O device 112 may also be any type of input device either requiring or not requiring user intervention, such as a keyboard, a numerical keypad, a mouse, a trackball, a microphone, a touch-sensitive device (e.g., a touchscreen), a sensor, or a gesture-sensitive input device.

The I/O device 112 may alternatively or additionally be formed of a communication device for transmitting signals and/or data. For example, the I/O device 112 may include a wired means for transmitting signals or data from the apparatus 102 to another device. For another example, the I/O device 112 may include a wireless transmitter or receiver using a protocol compatible to transmit signals from the apparatus 102 to another device or to receive signals from another device to the apparatus 102.

The apparatus 102 may include a communication device 114 to communicate with another device. The communication may be via a network 106. The network 106 may be one or more communications networks of any suitable type in any combination, including, but not limited to, networks using Bluetooth communications, infrared communications, near field connections (NFCs), wireless networks, wired networks, local area networks (LANs), wide area networks (WANs), virtual private networks (VPNs), cellular data networks, or the Internet. The communication device 114 may be implemented in various ways, such as via a transponder/transceiver device, a modem, a router, a gateway, a circuit, a chip, a wired network adapter, a wireless network adapter, a Bluetooth adapter, an infrared adapter, an NFC adapter, a cellular network chip, or any suitable type of device in any combination that is coupled to the apparatus 102 to provide functions of communication with the network 106.

Similar to the apparatus 102, the apparatus 104 may include a processor 116, a memory 118, an I/O device 120, and a communication device 122. The implementations of elements 116-122 of the apparatus 104 may be similar to the corresponding elements 108-114 of the apparatus 102.

Each of the apparatus 102 and the apparatus 104 may be, such as at different times of a real-time communication session, a receiving device (i.e., a receiver) or a sending device (i.e., a sender). A receiver may perform decoding operations, such as of wide-angle video streams. As such, the receiver may also be referred to as a decoding apparatus or device and may include or be a decoder. A sender may also be referred to as an as an encoding apparatus or device and may include or be an encoder. The apparatus 102 may communicate with the apparatus 104 via the network 106.

Figure 2A:
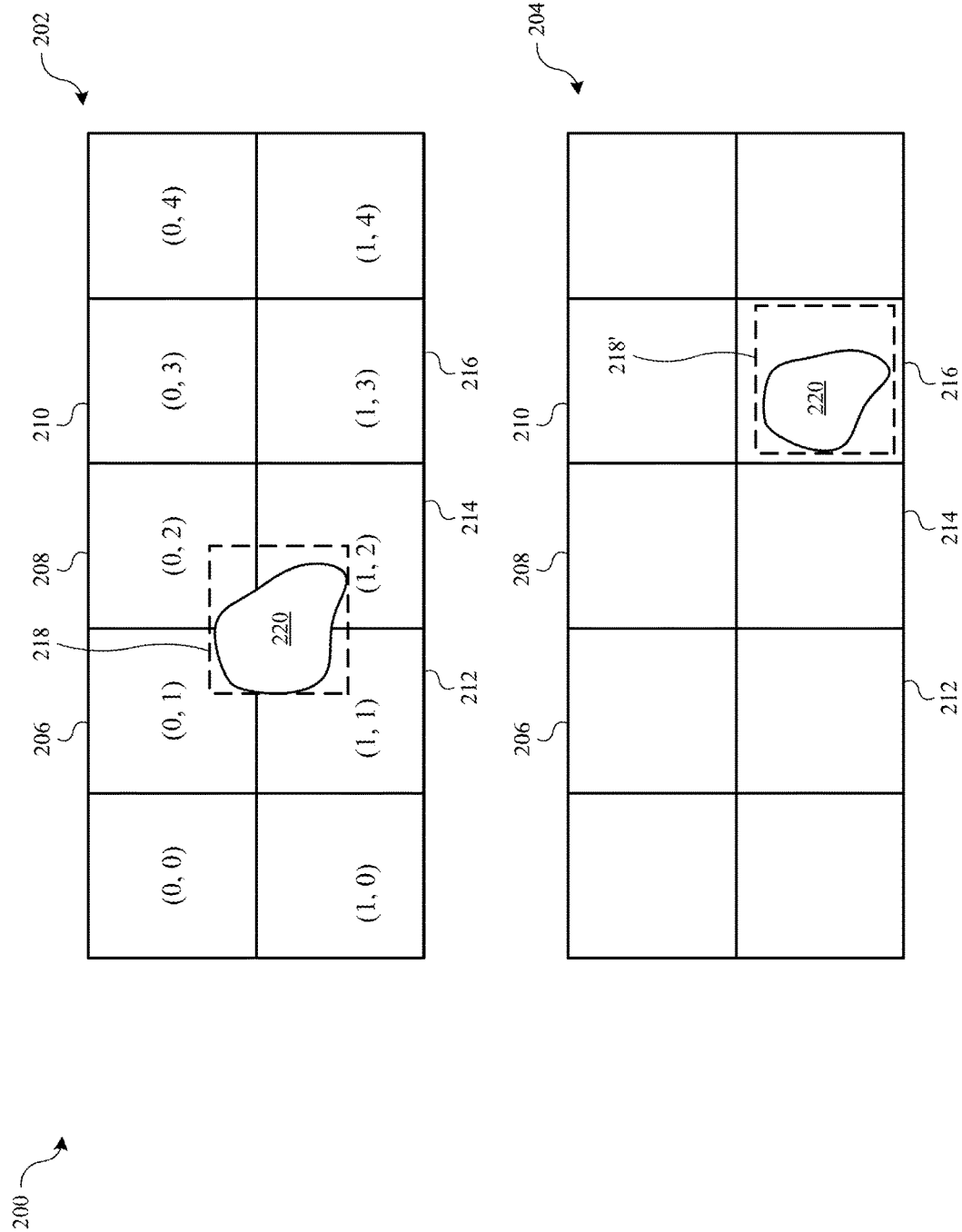
FIG. 2A is a diagram of an example of tiles of images of a video stream.

FIG. 2A is a diagram of an example of tiles of images of a wide-angle video stream (e.g., a video stream 200). The video stream 200 can be a video source stream for encoding or a video stream decoded from a video bitstream. The example in FIG. 2A illustrates two images (i.e., an image 202 and an image 204) of the video stream 200. The image 202 and the image 204 may be part of a larger overall image, such as a wide-angle image. That is, each of the images 202, 204 is partitioned into ten tiles, including tiles 206-216, arranged in a 2×5 grid, which may represent a viewport (i.e., a portion) of the overall wide-angle image.

For example, while the tiles 206-216 may be arranged in a 2×5 grid, the overall wide-angle image may be partitioned into a 5×5 gride, whereby the viewport represented by the tiles 206-216 may represent only 10 tiles out of the total 25 tiles of the overall wide-angle image. Thus, for purposes of the teachings herein, bitrate allocation may be applied to all of the tiles of the overall wide-angle image or may only be applied to a portion of the tiles, such as the tiles 206-216 representing a viewport of the overall wide-angle image.

As can be appreciated, the video stream 200 may include many more than two images. Additionally, as stated above, the images 202 and 204 are partitioned into tiles. Each tile corresponds to a spatial location within the image and may be identified based on that location. The example in FIG. 2A illustrates that each of the images 202, 204 is partitioned into ten tiles, including tiles 206-216, arranged in a 2×5 grid. However, the disclosure is not so limited, and an image may be partitioned into more or fewer tiles, rows, and/or columns.

In an example, a tile may be identified using Cartesian coordinates. For example, the tile 206 may be identified as the tile at the location (0, 1), the tile 216 may be identified as the tile at the location (1, 3), and so on. In another example, the tiles may be identified according to their positions in a scan order of the image. That is, the tiles may be numbered, for example, from 0 to the maximum number of tiles in the image minus 1. As such, the tiles of the image 202 may be numbered from 0 to 9 where the tiles 206-216 are identified as the tiles numbered 1, 2, 3, 6, 7, and 8, respectively.

The image 204 may be later-in-time from the image 202 in the video stream 200. The example in FIG. 2A illustrates a viewport 218 that includes an object 220 that a viewer (not shown) may be tracking. The viewport 218 may be encompassed by the tiles 206, 208, 212, and 214. The image 204 illustrates that the object 220 has moved and that the new viewport is now a viewport 218', whereby the viewport 218' is encompassed only by the tile 216.

The wide-angle video stream may be encoded using bitrate allocation. Each image of the wide-angle video may be partitioned into tiles. The tiles may be allocated a bitrate based upon an overall bitrate quota, whereby the overall bitrate quota may be determined based upon a total bitrate limit for transmission of the image by the sender. That is, the overall bitrate quota may be defined by network capabilities of the network. As such, each tile may be allocated a portion of the overall bitrate quote. As discussed in further detail below, an allocated bitrate of each tile may be adjusted before, during, or after transmission of the image to improve the image quality of the image displayed by the receiver.

By way of example, as discussed above, the image 204 may be partitioned into a 2×5 grid that contains a total of 10 tiles, including the tiles 206-216. Each of the tiles may be initially allocated a bitrate for transmission of the tiles from the sender to the receiver. For example, each of the tiles may be initially allocated an equal portion of the overall bitrate quota (e.g., 1/10 of the overall bitrate quota). The image 204 may be transmitted from the sender to the receiver, whereby the sender and/or the receiver may evaluate the image quality of the image 204. Based upon such an evaluation, the sender and/or the receiver may determine that the image quality of the image 204 may require improvement. That is, the image 204 displayed by the receiver may be blurry, distorted, or otherwise unclear for a viewer.

To improve the image quality of the image 204 and/or images transmitted from the sender to the receiver at a point in time after transmission of the image 204 (i.e., subsequent images), the receiver may reallocate the overall bitrate quota to the tiles. For example, due to the object 220 being located within the tile 216, the overall bitrate quota may be reallocated to increase the bitrate allocated to the tile 216 and decrease the bitrates allocated to one or more of the other tiles. That is, due to the complexity of the image contained within the tile 216 (e.g., due to the object 220 being located within the tile 216), the tile 216 may require a higher bitrate compared to other tiles that (e.g., tiles that do not contain the object 220). As a result, the overall bitrate quote may be dynamically allocated during the wide-angle video stream to improve the image quality displayed by the receiver.

Figure 2B:
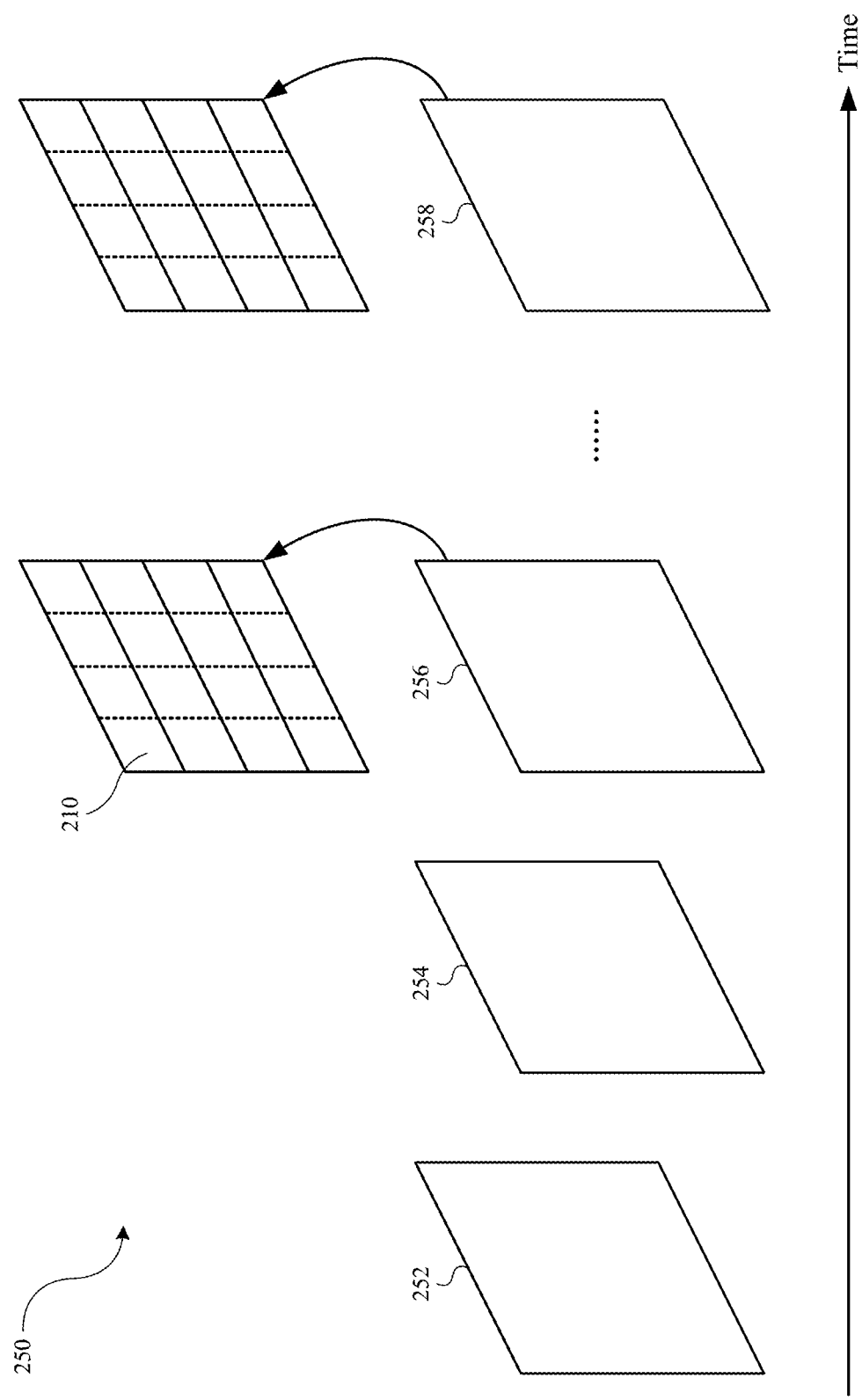
FIG. 2B illustrates encoding tiles of an image of a video stream.

FIG. 2B illustrates encoding tiles of an image of a wide-angle video stream. A timeline is shown in FIG. 2B, the arrow of which indicates the direction of time. A tile stream 250 may include a series of tiles along the timeline, including tiles 252-258. The tile stream 250 may be, for example, a stream over time of the tile 216 of FIG. 2A. As such, the tile 256 may be, for example, the tile 216 of the image 202 and the tile 258 may be the tile 216 of the image 204. A tile (e.g., the tile 256) that is encoded may be a tile that encompasses at least a portion of a viewport.

Each tile of the tile stream 250 may be divided into multiple processing units. In some video coding standards, the processing units may be referred to as "macroblocks" or "coding tree blocks" (CTBs). In some implementations, each processing unit may be further divided into one or more processing sub-units, in which the processing sub-units are referred to as "prediction blocks" or "coding units" (CUs) depending on the standards. The size and shape of the processing units and sub-units can be arbitrary, such as 8×8, 8×16, 16×16, 32×32, 64×64, or any size in any shape suitable for encoding a region of the picture. Typically, the more details the region includes, the smaller the size of the processing units and sub-units can be. For ease of explanation without causing ambiguity, the processing units and sub-units are uniformly referred to as "blocks" hereinafter unless explicitly described otherwise. For example, in FIG. 2B, the tile 256 is shown to have 4×4 blocks, including a block 210. The boundaries of the blocks are shown as dotted lines. However, such division of the tiles within the tile stream 250 is not limited to the above examples, and each tile may be sub-divided in any desired manner according to the teachings herein.

Figure 3:
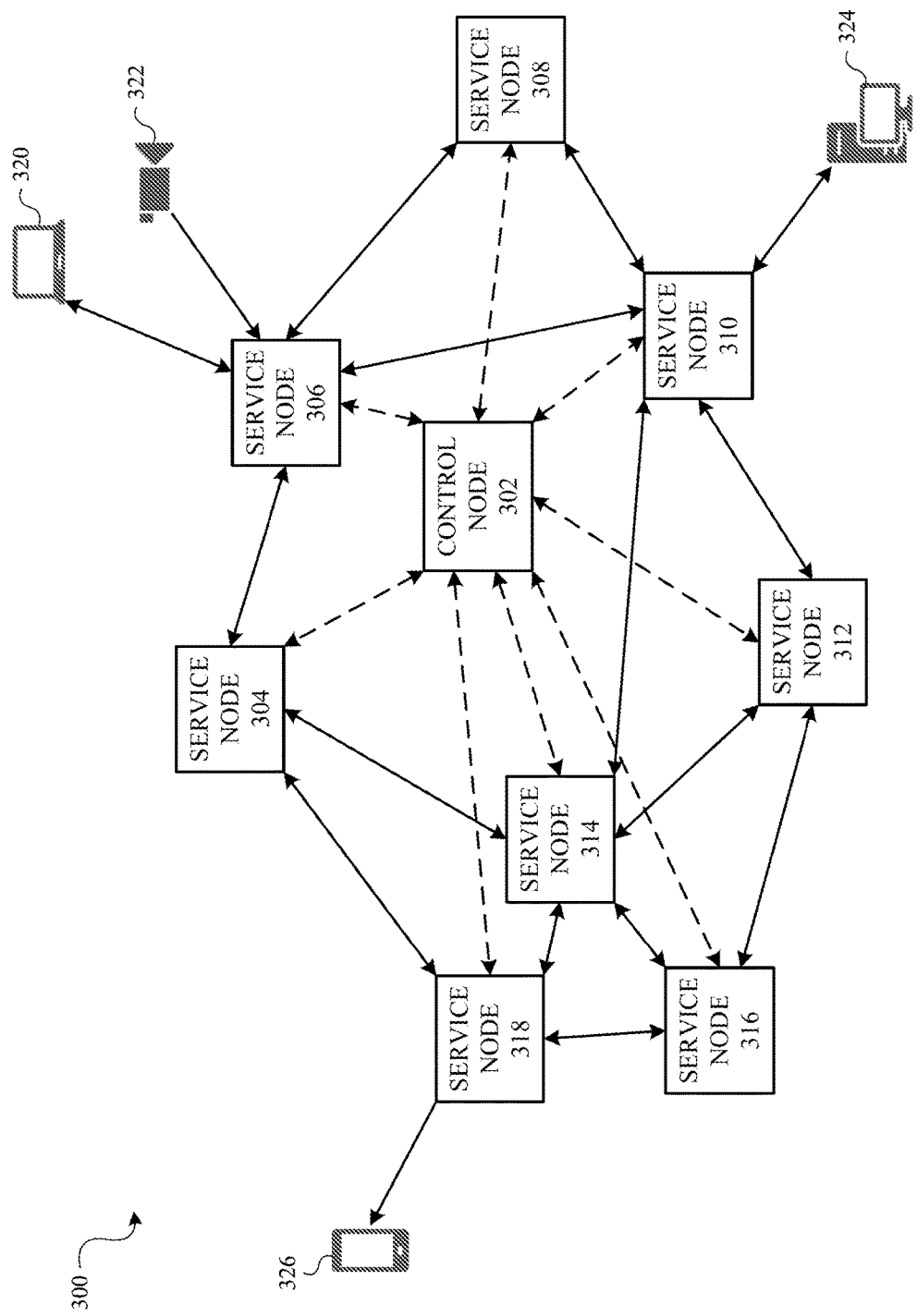
FIG. 3 is a diagram of an example of a network for real-time video communications.

FIG. 3 is a diagram of an example network 300 for real-time video communications, including wide-angle video communications. The network 300 may be implemented on an application layer of a computing network (e.g., the network 106 of FIG. 1). For example, in a TCP/IP model, a computer-communications network may be partitioned into multiple layers. For example, in a hierarchical order from bottom to top, the multiple layers may include a physical layer, a network layer, a transport layer, and an application layer. Each of the foregoing layers may serve the layer above it and may be served by the layer below it. The application layer may be the TCP/IP layer that directly interacts with an end user with software applications. The network 300 may be implemented as application-layer software modules in the network 106 of FIG. 1.

In some implementations, the network 300 may be implemented as software installed on nodes (e.g., servers) of the network 106. In some implementations, the network 300 may require no dedicated or specialized hardware (e.g., a dedicated or proprietary network access point hardware) on the nodes where it is implemented. For example, a node may be any x86 or x64 computer with a Linux® operating system (OS), and a network interface of the node functioning as an access point of the network 300 may be any general-purpose network interface hardware (e.g., an RJ-45 Ethernet adapter, a wired or wireless router, a Wi-Fi communications adapter, or any generic network interface hardware).

In addition, the network 106 of FIG. 1 where the network 300 is constituted may be a public network (e.g., the Internet). In some implementations, the nodes of the network 300 may be capable of communicating over the network 300 or the public network. In other words, the data traffic of the network 300 may be partially routed through the public network, not entirely within the network 300. In some implementations, all the nodes in the network 300 may be capable of simultaneously communicating over the network 300 and over the public network for the data traffic.

In FIG. 3, the network 300 includes two types of nodes: service nodes and control nodes. The service nodes (e.g., service nodes 304-318) may be used for receiving, caching, forwarding, and delivering multimedia data from and to different user terminals. The service nodes can also receive and transmit feedback messages. The control nodes (e.g., a control node 302) may be used for controlling the network traffic. Though not fully shown in FIG. 3, the service nodes and the control nodes may be interconnected with each other. That is, any two nodes in the network 300 may be directly connected. The connections between the nodes may be bidirectional or unidirectional. The connections between the nodes may be sometimes bidirectional and sometimes unidirectional. As can be appreciated, there may not be a direct connection between two nodes. As such, the nodes may indirectly communicate through a third node.

As shown in FIG. 3, the service nodes may be further divided into two types: edge service nodes (or "edge nodes" or "edge devices" for simplicity) and router service nodes (or "router nodes" for simplicity). An edge node may be directly connected to an end-user terminal (or "terminal" for simplicity), such as terminals 320-326. The terminals may include any end-user device capable of multimedia communications, such as a smartphone, a tablet computer, a camera, a display, a laptop computer, a desktop computer, a workstation computer, or an apparatus with a multimedia I/O device. A router node may be not directly connected to any terminal. A router node (such as the service nodes 304, 308, and 312-316) may participate in forwarding data. In some implementations, a service node can switch between roles of an edge node and a router node at different time, or function as both at the same time.

It should be noted that the network 300 may be implemented as having any number of any type of nodes with any configurations of interconnections, not limited to the example as shown in FIG. 3. It should also be noted that, while the network 300 includes the service nodes 304-318 and the control nodes 302, any network configuration may be possible in accordance with the present disclosure. That is, the network 300 is provided as an illustrative example, and the teachings described herein (e.g., the bitrate allocation methods described with respect to FIGS. 4-6 below) may be implemented by any type of network.

For example, the teachings herein may be implemented by any type of network, including but not limited to: point-to-point communication networks, multipoint communication networks, broadcast networks, video conferencing systems, satellite communication networks, internet protocol television (IPTV), mobile video communications using cellular networks and/or Wi-Fi, local area networks (LANs), wide area networks (WANs), or peer-to-peer video communications. Thus, the network 300 may be considered an optional example to illustrate a type of network that may be used in accordance with the present teachings.

Figure 4A:
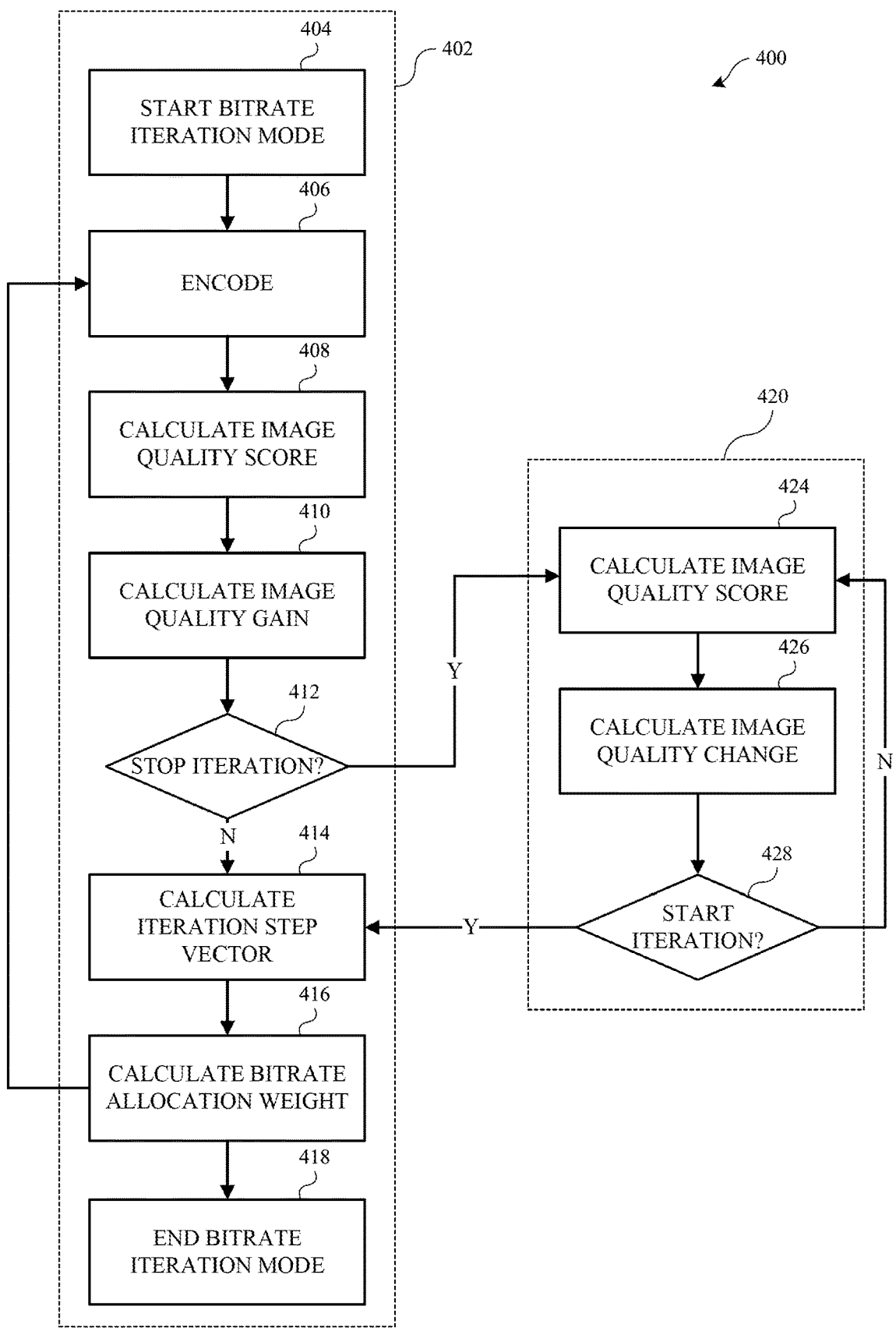
FIG. 4A is a flowchart of an example of a technique for allocating bitrate for video communications.

FIG. 4A is a flowchart of an example of a technique 400 for allocating bitrate for video communication, such as for real-time wide-angle video communication. The technique 400 may be implemented by a sender, such as the apparatus 102 and/or the apparatus 104 of FIG. 1. The technique 400 may be implemented as software modules stored in the memory 110 and/or the memory 118 of FIG. 1 as instructions and/or data executable by the processor 108 and the processor 116 of FIG. 1, respectively. For another example, the technique 400 may be implemented in hardware as a specialized chip storing instructions executable by the specialized chip.

The technique 400 may be performed by the sender at each time step. For example, if the sender is transmitting images of the wide-angle video for display at a rate of 30 frames per second, then the technique 400 may be performed once approximately every 33 milliseconds. Similarly, the technique 400 may be performed by the sender based upon a defined time duration. For example, the technique 400 may be performed by the sender once every X time steps, where X may be defined as a set number of time steps. Additionally, it should be noted that all or a portion of the technique 400 may also be performed by a receiver. For example, a portion of the technique 400 may be performed by the receiver and communicated to the sender through a network, such as the network 106.

As discussed above, the sender may be configured to encode images of a video stream using tiles, whereby each of the tiles may be allocated a bitrate based upon a total bitrate quota. Such allocation of bitrates to the tiles may be completed dynamically. That is, the total bitrate quota may be initially allocated to the tiles equally and, after evaluation of one or more factors, the sender may redistribute (i.e., reallocate) the total bitrate quota to the tiles. As such, an initial bitrate allocated to a tile may be modified to increase and/or decrease the bitrate to thereby improve the image quality displayed by the receiver.

As mentioned above, bitrate allocation may be completed at each time step of the video stream or may be completed based upon a defined time interval. As discussed in further detail below, the defined time interval for bitrate allocation may be predefined or dynamically adjusted based upon evaluation of the video stream by the sender and/or the receiver. For example, bitrate allocation may be completed more frequently when an image quality of the image displayed by the receiver is poor, and the bitrate allocation may be completed less frequently when the image quality of the image displayed by the receiver is clear.

The technique 400 may include one or more operating modes. The operating modes of the technique 400 may include one or more steps (i.e., operations) of the technique 400. The steps contained with the operating modes may be similar or may be unique to a given operating mode. For example, the technique 400 may include two operating modes, whereby both operating modes may include the same step or a shared step. However, each of the operating modes may include unique steps not completed by the receiver in both of the operating modes.

As shown in FIG. 4A, the technique 400 may include a bitrate iteration mode 402 and an image quality monitoring mode 420. As discussed in further detail below, the technique 400 may facilitate switching between the bitrate iteration mode 402 and the image quality monitoring mode 420.

The bitrate iteration mode 402 may start at 404. That is, initiation of the technique 400 may begin in the bitrate iteration mode 402 at 404. Once the bitrate iteration mode 402 commences at 404, the video stream may be encoded for transmission at 406. As discussed above, the technique 400 may be adapted for bitrate allocation of the video stream, such as a real-time wide-angle video stream. The video stream may be partitioned into tiles associated with a viewing angle of the video stream. Based upon the viewing angle of the video stream, the tiles may be associated with images of the video stream at each time step. That is, the video stream may be encoded and transmitted, from the sender to the receiver, as images partitioned into tiles over a time lapse.

Encoding at 406 may include encoding each of the tiles, such as the tiles 206-216 of FIG. 2A. Encoding at 406 may include allocating each of the tiles a bitrate. The encoder (i.e., the sender) may allocate a portion of the total bitrate quota (i.e., a total bitrate limit for transmission by the sender to the receiver) based upon a bitrate allocation bitrate vector. The bitrate allocation bitrate vector ($b^j$), measured in kilobits per second (kbps), may be determined using the following:

$$b^j = Bx^{j-1} \qquad \text{(Equation 1)}$$

wherein B is the total bitrate quota (kbps), $x^{j-1}$ is a bitrate allocation weight vector, and j is the round iteration. An iteration of the technique 400 within the bitrate iteration mode 402 may be considered a cycle of completion of operations 406-416. For example, as discussed in further detail below, each iteration may include encoding the tiles at 406 and one or more evaluations of the image transmitted to the receiver, whereby a subsequent iteration may begin back at 406 to reallocate bitrates to the tiles.

An initial state (i.e., an initial iteration where j=0) may be determined when a user switches to a new viewing angle of the video stream. At this initial state, all the tiles associated with the new viewing angle may be encoded with an initial bitrate allocation. Assuming that the number of tiles, n, are transmitted in total from the sender to the receiver, the initial bitrate allocation weight may be the following:

$$x^0 = \left[\frac{1}{n}, \frac{1}{n}, \ldots, \frac{1}{n}\right] \qquad \text{(Equation 2)}$$

wherein each of the tiles, n, may be allocated an equal bitrate based on the total bitrate quota B. That is, the bitrate of each tile may be $$\frac{B}{n}$$

After encoding is completed at 406, the encoded tiles may be transmitted by the sender to the receiver. The receiver may thus render the tiles at the first iteration (i.e., an initial iteration where j=0). Rendering by the receiver may include decoding and/or displaying the tiles. For example, the receiver may receive the encoded tiles having the initial bitrate allocation, decode the tiles, remap and stitch the tiles, and then display the tiles to display the viewing angle of the video (e.g., to display a first image of the video stream). It should be noted that the receiver may also receive and decode some of the tiles without displaying the tiles. For example, only tiles within a viewport of an audience may be transmitted to the receiver. In such a case, all tiles of the image may be used for rendering and display, yet some tiles may only be partially rendered due to portions of the tiles being outside of the viewport.

After encoding at 406 of the tiles, the encoded tiles are transmitted to the receiver and an image quality score may be determined at 408. Determining the image quality score at 408 may include assessing the quality of the image transmitted to the receiver (i.e., the image partitioned into the encoded tiles). That is, the image quality score may be a comparison of the compressed (i.e., encoded) image and the original image. The image quality score may be determined by the sender and/or the receiver. For example, the image quality score may be determined by the sender by assessing the quality of the encoded (e.g., compressed) image or tiles thereof compared to the original, uncompressed image or tiles thereof. Alternatively, or additionally, the image quality score may be determined by the receiver by assessing the rendered (e.g., decoded and/or displayed) image or tiles directly through a no-reference image quality evaluation model. Moreover, the sender and the receiver may communicate with one another to determine the image quality score. For example, the receiver may decode and display the image, at which point the receiver may transmit information pertaining to the displayed image back to the sender, whereby the sender may use the information sent from the receiver to assess the image quality score of the image.

The image quality score may be determined using various metrics and/or subjective evaluations. That is, determining the image quality score is not particularly limited to any one method. The image quality score may be determined using objective metrics, such as by determining the Mean Squared Error (MSE), the Peak Signal-to-Noise Ration (PSNR), or the Structural Similarity Index (SSI). The image quality score may also be determined by assessing various metrics of the image, such as but not limited to, contract, brightness, and color accuracy. Additionally, the image quality score may be determined using one or more machine learning models (e.g., deep learning models such as neural network).

The image quality score of the encoded image may be calculated at each time step of the video stream or may be calculated based upon a predefined time interval. That is, the image quality score may be determined based on a defined interval, whereby the image quality score may be determined for each time step or a portion of the time steps. As a result, at 408, an overall image quality score may be calculated based on the image quality scores determined previously. For example, the overall image quality score may be calculated based on the image quality scores calculated for previous iterations of the video stream in the last T seconds. That is, the overall image quality score may be calculated based on the image quality scores calculated for previous iterations within a set time range (i.e., the last T seconds). Thus, the overall image quality score ($q^j$) may be represented as the following:

$$q^j = [q_1^j, q_2^j, \ldots, q_n^j] \quad \text{(Equation 3)}$$

wherein j represents the round of iteration of the technique 400 within the bitrate iteration mode 402 and n represents the number of partitioned tiles. For example, as shown in FIG. 2A, n may be a number from 1 to 10 to represent the 10 tiles, including the tiles 206-216, of the image 202.

Once the overall image quality score ($q^j$) is determined, the average image quality score ($q_{avg}^j$) of all the tiles of the image may be determined using the following:

$$q_{avg}^j = \sum_{i=1}^{n} q_j^i \quad \text{(Equation 4)}$$

Once the average image quality score ($q_{avg}^j$) is determined using Equation 4, an image quality gain may be calculated at 410. The image quality gain may represent an average gain (e.g., improvement) in the image quality of the image encoded and sent from the sender to the receiver. For example, the image quality gain may represent an average gain (e.g., improvement) in the image quality score, as determined above, based on a set change in bitrate between iterations j. Such a set change in bitrate may be based on bitrate changes due to allocation of bitrates for the tiles. For example, the image quality gain may represent an average gain in the image quality score for every 100 kbps of bitrate change between iterations j. Therefore, the image quality gain may indicate a rate of improvement of the image quality based upon tiles that have increased bitrates due to reallocation of bitrates to each tile. That is, the image quality gain may track a rate of change (e.g., improvement) of the image quality between iterations j of the bitrate iteration mode 402.

To calculate the image quality gain, it may first be determined if the bitrate allocation ratio between the tiles has changed between the current iteration and the previous iteration. That is, a change in bitrate allocation may be represented by the following:

$$x^j \mathrel{!=} x^{j-1} \quad \text{(Equation 5)}$$

wherein, as discussed above, x represents the bitrate allocation weight vector used to allocate bitrates to the tiles.

If there has been a change in bitrate allocation ratios as described above, the average image quality gain, $\text{gain}^j$, may be determined using the following:

$$\text{gain}^j = 100 \frac{\sum_{i=1}^{m}(q_i^j - q_i^{j-1})}{\sum_{i=1}^{m}(b_i^j - b_i^{j-1})} \quad \text{(Equation 6)}$$

wherein m is the number of tiles with increased bitrates, $b_j^i$ is the bitrate (kbps) of the tile i in the j iteration. As discussed above, if there is no change in the bitrate allocation ratio (e.g., $x^j = x^{j-1}$), then the gain may be determined to be 0, or alternatively, an invalid determination may be provided by the sender and/or the receiver.

After the image quality gain is determined at 410, it may be determined at 412 whether to stop cycling through iterations of the bitrate iteration mode 402. That is, it may be determined at 412 whether the technique 400 may move from the bitrate iteration mode 402 to the image quality monitor mode 420. Due to the dynamic reallocation of bitrates to the tiles in the bitrate iteration mode 402, operation of the technique 400 in the bitrate iteration mode 402 may require significant computing power and/or network bandwidth of a network.

Comparatively, the image quality monitor mode 420 may only monitor the image quality without dynamically allocating bitrates to the tiles. Moreover, the calculation frequency may be lower compared to that in the bitrate iteration mode. As such, the image quality monitor mode 420 may require less computing power and/or network bandwidth of the network compared to the bitrate iteration mode 402. For example, as discussed below, the image quality monitor mode 420 may monitor the image quality such that, if the image quality is not within an acceptable range or does not meet one or more parameters, the technique 400 may switch from the image quality monitor mode 420 back to the bitrate iteration mode 402, at which point bitrates may be evaluated and reallocated as described above.

As discussed further below with respect to FIG. 4B, one or more factors may be evaluated at 412 to determine whether the bitrate iteration mode 404 should be stopped and the technique 400 should move to the image quality monitor mode 420. For example, if the image quality gain is too low, the technique 400 may move from the bitrate iteration mode 404 to the image quality monitor mode 420. Additionally, if the image quality between the tiles converges such that the maximum image quality tile and the minimum image quality tile fall within a threshold, the technique 400 may move from the bitrate iteration mode 404 to the image quality monitor mode 420. Moreover, if the bitrate of any of the tiles reaches a preset minimum bitrate, the technique 400 may move from the bitrate iteration mode 404 to the image quality monitor mode 420. However, any factors may be evaluated at 412 to determine moving from the bitrate iteration mode 402 to the image quality monitor mode 420.

If it is determined at 412, such as based on the above factors, that the technique 400 should move from the bitrate iteration mode 402 to the image quality monitor mode 420, the image quality score may be calculated at 424. The image quality score may be calculated similar to the calculation of the image quality score at 408. It should be noted that the bitrate allocation ratio (e.g., bitrates allocated to each tile)

between the tiles may remain the same during the image quality monitor mode 420. However, a calculation interval between each image quality score calculation may be increased. That is, a time interval between (i.e., a time duration) image quality score calculations at 424 may be greater than a time interval (i.e., a time duration) between image quality score calculations at 404 in the bitrate iteration mode 402. Such time duration may be any predefined or adjusted time interval based on the technique 400.

Once the image quality score is determined at 424, an image quality change may be determined at 426. That is, the image quality score determined at 424 may be compared to the image quality score from the previous or most recent iteration j. The previous or most recent iteration j may be calculated at 408 or 424 depending on the current iteration of the technique 400.

After determining the image quality change, it may be determined at 428 whether the technique 400 should move from the image quality monitor mode 420 to the bitrate iteration mode 402. Such determination may be based on the image quality change determined at 426. For example, if the image quality score vector after the last iteration is $q^l$ (i.e., the image quality score vector determined at 408 during the last iteration of the bitrate iteration mode 402) and the image quality score vector in the current image quality monitoring mode 420 is $q^j$, the determination at 428 to switch back to the bitrate iteration mode 402 may be determined using the following:

$$\sum_{i=1}^{n} \left( |q_i^j - q_i^l| \right) > q_{thres} \qquad \text{(Equation 7)}$$

If Equation 7 is determined to be true, that is if the image quality change determined based on the above is greater than (i.e., exceeds) the threshold ($q_{thres}$), then the technique 400 may switch from the image quality monitor mode 420 to the bitrate iteration mode 402. However, if the image quality change determined based on the above is less than the threshold ($q_{thres}$), then the technique 400 remains in the image quality monitor mode 420 and recalculates the image quality score at 424 after the set calculation interval.

If the sender and/or the receiver determines at 412 to not enter the image quality monitor mode 420 or if the sender and/or the receiver determines at 428 to reenter the bitrate iteration mode 402, an iteration step vector may be determined at 414. The iteration step vector determined at 416 may be based on, or used in conjunction with, the bitrate allocation weight vector xi. In particular, the iteration step vector determined at 416 may be used to determine new bitrates for each of the tiles (i.e., new bitrates for reallocation).

By way of example, as discussed above, the image quality of the encoded image (e.g., the encoded tiles) may be improved at each iteration of the bitrate iteration mode 402 to improve a user experience when the encoded image is transmitted from the sender to the receiver and displayed by the receiver. To facilitate such image quality improvements (e.g., improvements in the image quality score of the image), reallocation of the total bitrate quota may be completed to adjust bitrates of each of the tiles. In such a case, bitrates of low-complexity tiles that contain minimal or no objects, such as the tiles 206-214 of the image 204, may be reduced. Due to the decrease in bitrates of the low-complexity tiles, the bitrates of high-complexity tiles that contain more detail and/or objects, such as the tile 216 in the image 204, may be increased. That is, excess bits of the low-complexity tiles that may not be needed to encode and transmit the low-complexity tiles with an acceptable image quality may be reassigned (e.g., reallocated) to the high-complexity tiles that may require additional bits for acceptable encoding and transmission.

It should be noted that while the above allocation method may be generally acceptable to improve the image quality, in certain conditions the rate of increase and/or decrease in bitrates of the tiles may be too dramatic and thereby negatively impact the user experience (e.g., negatively impact the video quality). For example, the aforementioned low-complexity tiles may often have high image quality scores determined at 408. Due to their high image quality scores, the technique 400 may seek to dramatically decrease their bitrates to increase the bitrates of the high-complexity tiles. The iteration step vector determined at 414 may be used to ensure that the rate of decrease in such a case is not too drastic—that is, to ensure that the gradient between a bitrate of the current iteration and a bitrate of a subsequent iteration is not too steep.

By way of example, the iteration step vector ($w^j$) may be used to reduce the variance of the image quality between all the tiles. The bitrate of each of the tiles may be proportional to the image quality of each of the tiles. Based on such proportionality, the bitrate allocation weight ($x^j$) may be determined using the following:

$$x^j = x^{j-1} - \alpha \left( \frac{q^j - q_{avg}^j}{q_{avg}^j} \right) x^{j-1} \qquad \text{(Equation 8)}$$

wherein $q^j$ represents the image quality score at j iteration, $q_{avg}^j$ is the average image quality score of all the image tiles at j iteration, and a is a control parameter of the iteration step size. It should be noted that the control parameter (a) may be a default value (e.g., 0.5) and may be adjusted based upon the technique 400 as needed.

In addition to determining the bitrate allocation weight ($x^j$) based on Equation 8, the tile bitrate step size of the change (e.g., the difference in allocated bitrates between iterations) may be proportional to the following:

$$w_{old}^j = q^j - q_{avg}^j \qquad \text{(Equation 9)}$$

Based on the bitrate allocation weight and the tile bitrate step size as determined above, the step vector ($w^j$) may be determined. All elements of $q_i^j - q_{avg}^j$ are greater than 0 and may be represented as vector $w_{positive}^j$, the average value of vector $w_{positive}^j$ may be represented as $w_{avg+}^j$. Additionally, vector $w_{positive}^j$ may be readjusted to decrease variance between the image quality scores of the tiles such that vector $w_{positive}^j$ may be represented as vector $w_{positive}^{new,j}$, whereby the vector $w_{positive}^{new,j}$ may be represented as the following:

$$w_{positive}^{new,j}(i) = \beta \left( w_{positive}^{i,j} - w_{avg}^j \right) + w_{avg+}^j \qquad \text{(Equation 9)}$$

wherein β is between 0 and 1, which may cause the original vector $w_{positive}^j$ to converge towards an average image quality of the tiles.

Based on the above, the positive vector in $w_{old}^j$ may be replaced with $w_{positive}^{new,j}$ to obtain the final iteration step vector ($w^j$).

For illustrative purposes, the image may include a first tile, a second tile, and a third tile. A first vector value, a second vector value, and a third vector value may each measure a difference between the average image quality of all of the tiles and the first tile, the second tile, and the third tile, respectively. For example, the first vector value may measure a difference of 1.5 between the image quality of the first tile and the average image quality, the second vector value may measure a difference of 0.8 between the image quality of the second tile and the average image quality, and the third vector value may measure a difference of 0.6 between the image quality of the third tile and the average image quality. Assuming that the first tile, the second tile, and the third tile all have a higher image quality than the average image quality (e.g., the first tile, the second tile, and the third tile are all positive values), vector $w_{positive}^j$ may be represented as the following:

$$w_{positive}^j = [1.5, 0.8, 0.6] \quad \text{(Equation 10)}$$

The above vector values of the first tile, the second tile, and the third tile may then be adjusted using Equation 9 above (i.e., using $\beta$ within Equation 9, wherein $\beta$ may have a value between 0 and 1) to decrease the variance between the vector values for the first tile, the second tile, and the third tile to determine the re-adjusted vector ($w_{positive}^{new,j}$). For example, if $\beta$ is 0.5, the re-adjusted vector may be determined, based on Equation 9, to be the following:

$$w_{positive}^{new,j} = [1.287, 0.867, 0.747] \quad \text{(Equation 11)}$$

Thus, the re-adjusted vector ($w_{positive}^{new,j}$) may replace $w_{old}^j$ to obtain the final step vector ($w_j$).

Once the iteration step vector is determined at 414, a new bitrate weight (e.g., bitrate allocation weight vector) for each of the tiles may be determined at 416. The new bitrate allocation weight vector ($x^j$) may be determined using the following:

$$x^j = x^{j-1} - \alpha\left(\frac{w^j}{q_{avg}^j}\right)x^{j-1} \quad \text{(Equation 12)}$$

wherein $\alpha$ is a parameter that controls the iteration j step size as discussed above such that the larger the value of $\alpha$, the more aggressive the change in bitrates of the tiles, or vice versa.

Based on the above, the change (e.g., gradient) in bitrate for the tiles at 416 for the current iteration compared to a previous iteration may be completed gradually without impairing the user experience for the image displayed by the receiver. To further ensure that the bitrate for the tiles is dynamically allocated in a gradual manner, a validity check may be completed at 416. By way of example, at 416, it may be determined whether the bitrate allocation weight calculated at 416 is valid using the following:

$$\max(q^j) - \min(q^j) \leq \text{quality\_margin} \quad \text{(Equation 13)}$$

That is, the validity check at 416 may be based on determining whether a difference between the maximum image quality score of the tiles and the minimum image quality score of the tiles is less than or equal to a defined threshold (i.e., the quality_margin). If the validity check at 416 is successful and the conditions of Equation 13 are met, then the bitrate allocation weight may be determined to be $x^j = x^{j-1}$. After the conditions of Equation 13 are met, the bitrate allocation weight may be used in at 406 to encode the tiles in the next iteration. Conversely, if the conditions of Equation 13 are not met—that is, the difference between the maximum image quality score of the tiles and the minimum image quality score of the tiles is greater than the defined threshold (i.e., the quality_margin)—the bitrate allocation weight may be returned with the updated value obtained by Equation 12.

Additionally, it should be noted that after completing any iteration of the bitrate iteration mode 402, the bitrate iteration mode may be ended at 418. That is, the technique 400 may end at 418 based upon user input or termination of the video stream. For example, when real-time wide-angle video stream is ended, such as by the sender, the technique 400 may be ended or otherwise completed at 418.

While the technique 400 shows that the paths 404-418 and 424-428 may be performed in an alternating matter, that need not be the case. In an implementation, the path 404-418 may be performed in parallel to the path 424-428. That is, in an implementation, the image quality monitor mode 420 may be performed in parallel to the bitrate iteration mode 402. Additionally, other arrangements of the steps of the technique 400 may also be possible.

Figure 4B:
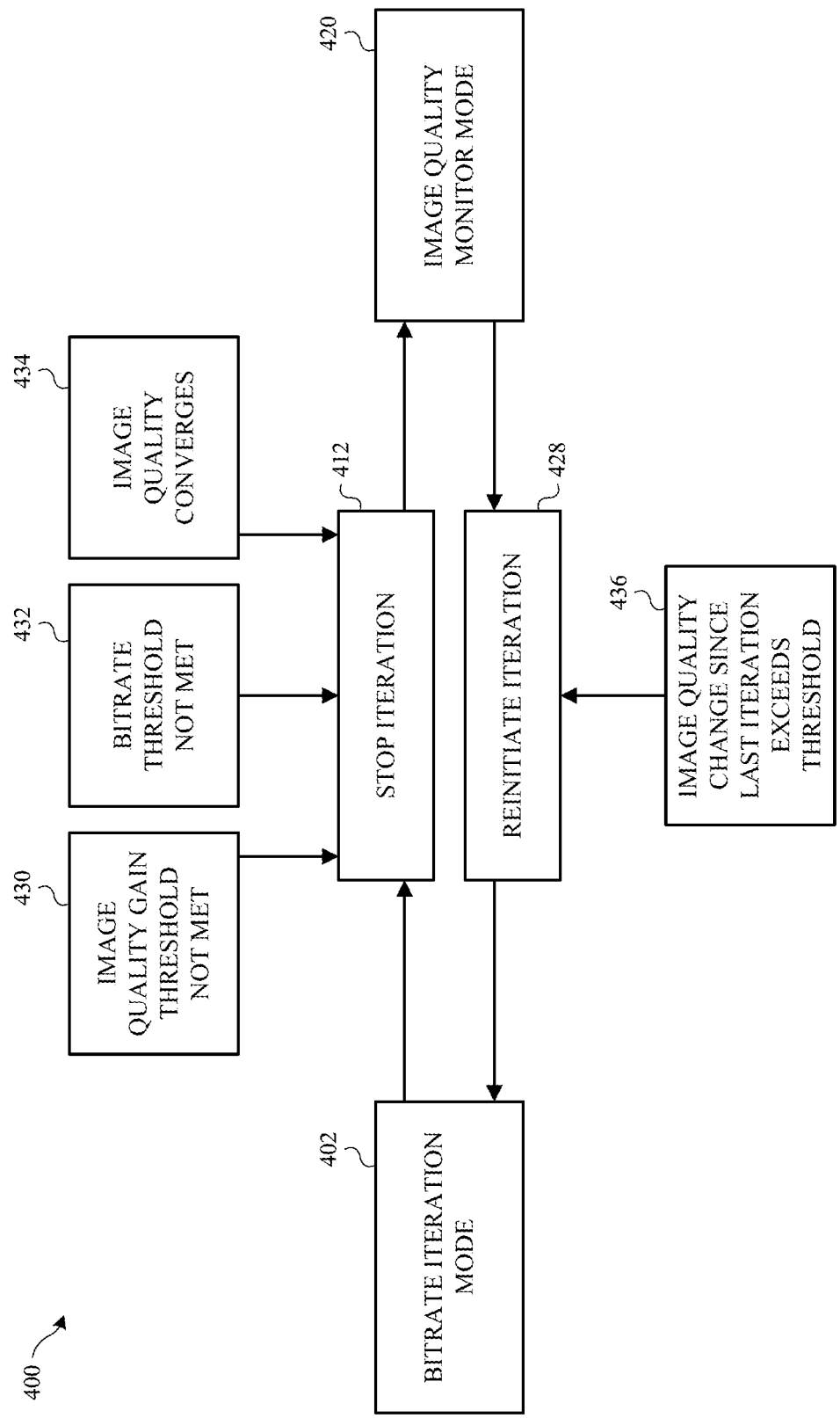
FIG. 4B is a diagram of operating modes of the technique of FIG. 4A for allocating bitrate for video communications.

FIG. 4B is a diagram of operating modes of the technique 400 for allocating bitrate for video communications, such as for real-time wide-angle video communication. As discussed above, the technique 400 may be implemented as software modules stored in the memory 110 and/or the memory 118 of FIG. 1 as instructions and/or data executable by the processor 108 and the processor 116 of FIG. 1, respectively. For another example, the technique 500 may be implemented in hardware as a specialized chip storing instructions executable by the specialized chip. Additionally, as described above with respect to the technique 400, the technique 500 may be performed by the sender and/or the receiver at each time step.

As discussed above, the technique 400 may include the bitrate iteration mode 402 and the image quality monitor mode 420. The technique 400 may facilitate switching between the bitrate iteration mode 402 and the image quality monitor mode 420 based upon a determination on whether one or more conditions are met. Such a determination on the one or more conditions may be done at 412 or at 428. That is, the determination on whether the one or more conditions are met may be completed within the bitrate iteration mode 402 at 412 to stop the iteration and enter the image quality monitor mode 420 or the determination on whether the one or more conditions are met may be completed within the image quality monitor mode 420 at 428 to reinitiate (i.e., reenter) the bitrate iteration mode 402.

Entering the image quality monitor mode 420 from the bitrate iteration mode 402 may facilitate less frequent evaluation of the image quality, thereby reducing the computing power and/or network bandwidth of the network needed. To determine whether to enter the image quality monitor mode 420 and stop the iteration of the bitrate iteration mode 420 at 412, one or more conditions may be evaluated. The iteration may be stopped at 412 based upon meeting all or only a portion of the conditions.

By way of example, if an image quality gain threshold is not met at 430, the iteration may be stopped at 412 and the technique 400 may enter the image quality monitor mode 420. At 430, it may be determined whether the average image quality gain of the image (e.g., the tiles of the image) is too low compared to a defined threshold. If the average image quality gain is too low, the image quality monitor mode 420 may be entered and commenced based on the path 424-426.

To evaluate this condition at 430, it may first be determined if the bitrate has been reallocated within the current iteration. If the bitrate has been reallocated within the current iteration j, that is $x^j \ne x^{j-1}$, then the average gain ($gain^j$) of the image quality score of the image (e.g., the tiles) may be determined using the following:

$$gain^j = \frac{\sum_{i=1}^{m}(q_i^j - q_i^{j-1})}{\sum_{i=1}^{m}(b_i^j - b_i^{j-1})} \times 100 \qquad \text{(Equation 14)}$$

wherein m represents the number of tiles with increased bitrates (i.e., the number of tiles that have been reallocated a bitrate that is greater than their bitrate in the previous iteration), j represents the j-th iteration, and i represents the i-th tile among all m tiles. Based on the above, the average gain ($gain^j$) may be the average gain of the image quality score with every 100,000 of bitrate change after the present iteration.

Based on the above, the average gain may be compared to a gain threshold using the following:

$$gain^j > gain\_thresh \qquad \text{(Equation 15)}$$

If the average gain is greater than the threshold, then the technique 400 may not stop the iteration at 412 and the bitrate iteration mode 402 may be continued in the next iteration based on the path 406-416 described above. However, if the average gain is less than the threshold, then the iteration may be stopped at 412 and the image quality monitor mode 420 may be entered. It should also be noted that the above gain threshold evaluation may require a single determination based on Equation 15 or may require consecutive determinations based on Equation 15 before the iteration may be stopped at 412. For example, the gain threshold may be evaluated at 430 for each iteration, whereby a set number of iterations (e.g., 2 or 3 iterations) must return an average gain that is less than the threshold consecutively before the image quality monitor mode 420 may be entered.

In addition to the image quality gain threshold evaluation at 430, a bitrate threshold may be evaluated at 432 to determine whether to stop the current iteration at 412. The bitrate evaluation at 430 may be completed by comparing the minimum bitrate allocation bitrate ($b^j$) to a threshold using the following:

$$\min(b^j) \le \text{bitrate\_thresh} \qquad \text{(Equation 16)}$$

If the minimum bitrate allocation bitrate is less than or equal to the threshold (bitrate_thresh), then the iteration may be stopped at 412 and the image quality monitor mode 420 may be entered. Conversely, if the minimum bitrate allocation bitrate is greater than the threshold (bitrate_thresh), then the iteration may continue in the bitrate iteration mode 402.

Additionally, it may be determined at 434 whether the image quality of the tiles may be converging. That is, if the difference between the maximum and minimum values of all the tile image quality scores ($q_{max}$ and $q_{min}$, respectively) meets a defined threshold or falls within a defined margin, the iteration may be stopped at 412. Similar to the image quality gain threshold evaluation at 430, image quality convergence at 434 may be evaluated for each iteration of the bitrate iteration mode 402 and may not stop iteration at 412 until a defined number of iterations meet the conditions of the image quality convergence evaluation. The image quality convergence may be evaluated based on the following:

$$q_{max} - q_{min} \le \text{bitrate\_thresh} \qquad \text{(Equation 17)}$$

Therefore, based on the above, if the image quality gain threshold is not met at 430, if the bitrate threshold is not met at 423, or if the image quality converges to within the defined threshold margin at 434, the iteration of the bitrate iteration mode 402 may be stopped at 412 and the image quality monitor mode 420 may be entered.

As discussed above, the technique 400 may reenter or reinitiate the bitrate iteration mode 402 at 428 based on one or more conditions. By way of example, an image quality change may be evaluated at 436 to determine whether to reinitiate iteration of the bitrate iteration mode 402 at 428. It may be determined at 436 whether to reenter the bitrate iteration mode 402 by comparing the image quality score of the current iteration to the image quality score of the previous iteration. In particular, the image quality change at 436 may be determined using the following:

$$\sum_{i=1}^{n}(|q_i^j - q_i^l|) > q_{thresh} \qquad \text{(Equation 18)}$$

wherein $q^j$ is the image quality score of the current iteration j and $q^l$ is the image quality score of the previous iteration. If the quality threshold ($q_{thresh}$) is surpassed, then the bitrate iteration mode 402 may be reentered at 428 and continue forward within the iteration to calculate the iteration step vector at 414, as described above. Conversely, if the quality threshold ($q_{thresh}$) is not met, then the image quality monitor mode 420 may continue based upon the path 424-426, as described above.

Figure 5:
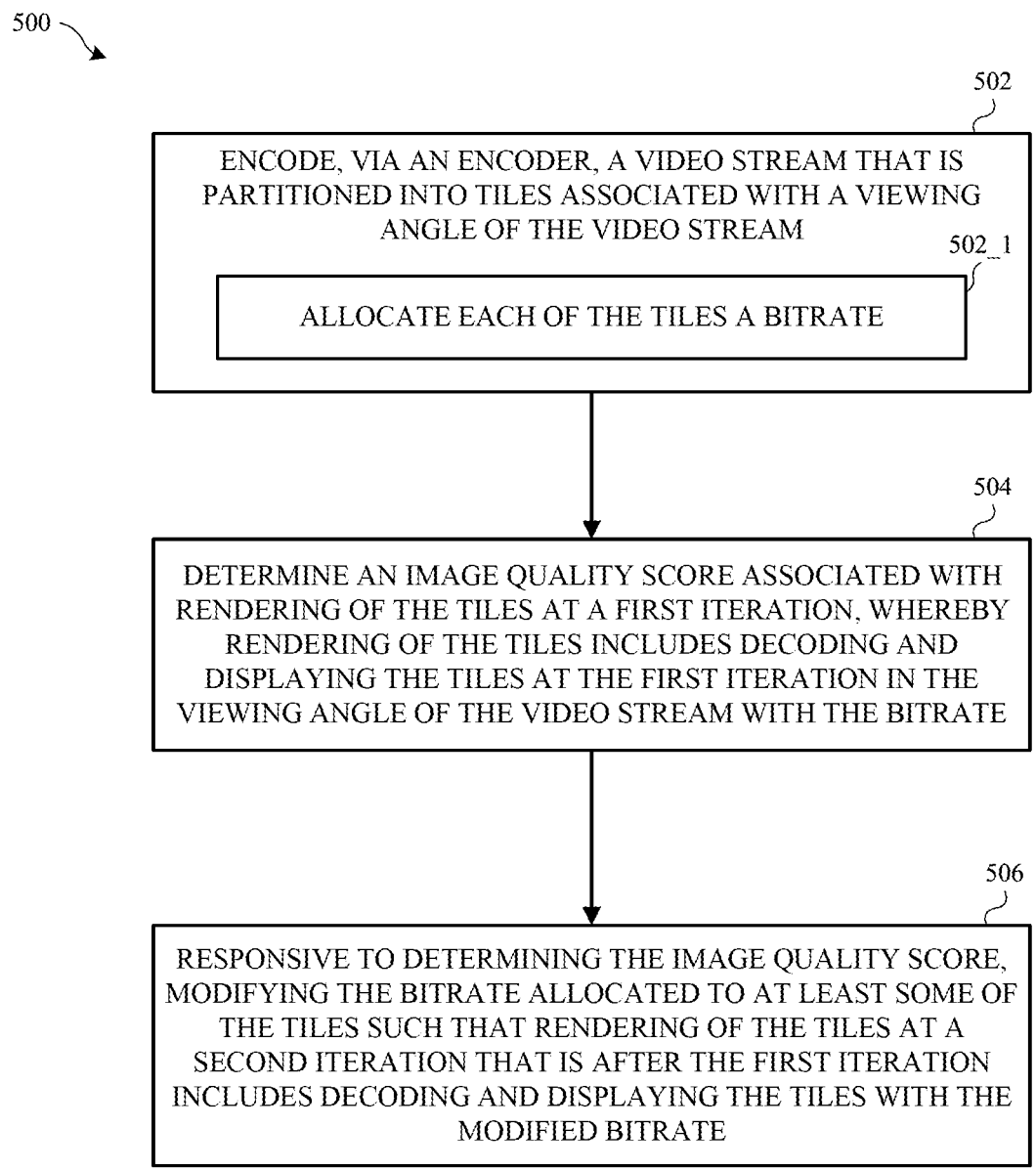
FIG. 5 is a flowchart of an example of a technique for allocating bitrate for video communications.

FIG. 5 is a flowchart of an example of a technique 500 for allocating bitrate for video communications, such as for real-time wide-angle video communication. The technique 500 may be similar to, or based upon, the technique 400 of FIGS. 4A and 4B. The technique 500 may be implemented by a sender (e.g., an encoder), such as the apparatus 102 and/or the apparatus 104 of FIG. 1. The technique 500 may be implemented as software modules stored in the memory 110 and/or the memory 118 of FIG. 1 as instructions and/or data executable by the processor 108 and the processor 116 of FIG. 1, respectively. For another example, the technique 500 may be implemented in hardware as a specialized chip storing instructions executable by the specialized chip. Alternatively, a portion of the technique 500 may be implemented by a service node of the network 300 of FIG. 3. For example, a portion of the technique 500 may be implemented as software modules stored in a memory of the network node as instructions and/or data executable by a process of the network node or a process of the sender (e.g., the encoder).

At 502, a video stream may be encoded, whereby the video stream may be partitioned into tiles, such as the tiles 206-216 of FIG. 2A, that may be associated with a viewing angle of the video stream, such as the image 204 of FIG. 2A. Each of the tiles may be allocated a bitrate at 502_1. Such allocation may be completed based on the encoding completed at 406 of the technique 400 described above with respect to FIG. 4A. Similarly, the allocation may be completed based on the reallocation process shown in the path 406-416 of the technique 400. In either case, the encoding may be completed within an iteration of the bitrate iteration mode 402 of the technique 400. For simplicity and illustrative purposes, the encoding at 502 may be completed at a first iteration of the bitrate iteration mode 402.

After encoding the tiles at 502, an image quality score may be determined at 504. The image quality score may be associated with rendering of the tiles (e.g., rendering of the tiles via the receiver), whereby rendering of the tiles may include decoding and/or displaying the tiles at the first iteration in the viewing angle of the video stream with the bitrate. The image quality score may be determined prior to or after rendering of the tiles by the receiver. For example, the image quality score may be determined after encoding the tiles by the sender or, alternatively, the image quality score may be determined by the receiver after decoding and/or displaying the image. Additionally, the image quality score may be determined as described above with respect to 408 of the technique 400.

Responsive to determining the image quality score at 504, the bitrate allocated to at least some of the tiles may be modified at 506. Modifying the bitrate allocated to at least some of the tiles may include reallocating the bitrates of low-complexity tiles to high-complexity tiles, thereby improving the overall image quality being rendered by the receiver. Such reallocation may be done based on the technique 400. For example, the modified bitrate may vary among the tiles that are allocated the modified bitrate.

By way of example, the image quality score at 504 may be determined similar to the image quality score determined at 408 of the technique 400. Once the image quality score is determined at 504, modifying (e.g., reallocating) the bitrates of the tiles at 506 may be based upon an image quality gain calculated, an iteration step vector calculated, and/or a bitrate allocation weight calculated. The image quality gain, the iteration step vector, and the bitrate allocation weight may be calculated based on the path 410-416 of the technique 400 as described above. Such calculations may thus be used to determine the reallocation of bitrates between the tiles.

Based on the reallocated bitrates for the tiles, a second iteration (i.e., an iteration after the first iteration) may be encoded by the sender and transmitted to the receiver for rendering such that the rendering of the tiles of the second iteration includes decoding and displaying the tiles with the modified (e.g., reallocated) bitrates. Therefore, the image decoded and display at the second iteration may be improved compared to the image displayed at the first iteration. The technique 500 may be completed any number of times to improve the overall image quality by reallocating bitrates to the tiles. Additionally, the technique 500 may include all or a portion of the bitrate iteration mode 404 as described above and/or may include all or a portion of the image quality monitor mode 420 as described above.

As described above, a person skilled in the art will note that all or a portion of aspects of the disclosure described herein can be implemented using a general-purpose computer/processor with a computer program that, when executed, carries out any of the respective techniques, algorithms, and/or instructions described herein. In addition, or alternatively, for example, a special-purpose computer/processor, which can contain specialized hardware for carrying out any of the techniques, algorithms, or instructions described herein, can be utilized.

The implementations of computing devices (i.e., apparatuses) as described herein (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing, either singly or in combination.

The aspects herein can be described in terms of functional block components and various processing operations. The disclosed processes and sequences may be performed alone or in any combination. Functional blocks can be realized by any number of hardware and/or software components that perform the specified functions. For example, the described aspects can employ various integrated circuit components, for example, memory elements, processing elements, logic elements, look-up tables, and the like, which can carry out a variety of functions under the control of one or more microprocessors or other control devices. Similarly, where the elements of the described aspects are implemented using software programming or software elements, the disclosure can be implemented with any programming or scripting languages, such as C, C++, Java, assembler, or the like, with the various algorithms being implemented with any combination of data structures, objects, processes, routines, or other programming elements. Functional aspects can be implemented in algorithms that execute on one or more processors. Furthermore, the aspects of the disclosure could employ any number of conventional techniques for electronics configuration, signal processing and/or control, data processing, and the like. The words "mechanism" and "element" are used broadly and are not limited to mechanical or physical implementations or aspects, but can include software routines in conjunction with processors, etc.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media and can include RAM or other volatile memory or storage devices that can change over time. A memory of an apparatus described herein, unless otherwise specified, does not have to be physically contained in the apparatus, but is one that can be accessed remotely by the apparatus, and does not have to be contiguous with other memory that might be physically contained in the apparatus.

Any of the individual or combined functions described herein as being performed as examples of the disclosure can be implemented using machine-readable instructions in the form of code for operation of any or any combination of the aforementioned hardware. The computational codes can be implemented in the form of one or more modules by which individual or combined functions can be performed as a computational tool, the input and output data of each module being passed to/from one or more further modules during operation of the methods and systems described herein.

The terms "signal" and "data" are used interchangeably herein. Further, portions of the computing devices do not necessarily have to be implemented in the same manner. Information, data, and signals can be represented using a variety of different technologies and techniques. For example, any data, instructions, commands, information, signals, bits, symbols, and chips referenced herein can be represented by voltages, currents, electromagnetic waves, magnetic fields or particles, optical fields or particles, other items, or a combination of the foregoing.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. Moreover, use of the term "an aspect" or "one aspect" throughout this disclosure is not intended to mean the same aspect or implementation unless described as such.

As used in this disclosure, the term "or" is intended to mean an inclusive "or" rather than an exclusive "or" for the two or more elements it conjoins. That is, unless specified otherwise or clearly indicated otherwise by the context, "X includes A or B" is intended to mean any of the natural inclusive permutations thereof. In other words, if X includes A; X includes B; or X includes both A and B, then "X includes A or B" is satisfied under any of the foregoing instances. Similarly, "X includes one of A and B" is intended to be used as an equivalent of "X includes A or B." The term "and/or" as used in this disclosure is intended to mean an "and" or an inclusive "or." That is, unless specified otherwise or clearly indicated otherwise by the context, "X includes A, B, and/or C" is intended to mean that X can include any combinations of A, B, and C. In other words, if X includes A; X includes B; X includes C; X includes both A and B; X includes both B and C; X includes both A and C; or X includes all of A, B, and C, then "X includes A, B, and/or C" is satisfied under any of the foregoing instances. Similarly, "X includes at least one of A, B, and C" is intended to be used as an equivalent of "X includes A, B, and/or C."

The use of "including" or "having" and variations thereof herein is meant to encompass the items listed thereafter and equivalents thereof as well as additional items. Depending on the context, the word "if" as used herein can be interpreted as "when," "while," or "in response to."

The use of the terms "a" and "an" and "the" and similar referents in the context of describing the disclosure (especially in the context of the following claims) should be construed to cover both the singular and the plural. Furthermore, unless otherwise indicated herein, recitation of ranges of values herein is intended merely to serve as a shorthand method of referring individually to each separate value falling within the range, and each separate value is incorporated into the specification as if it were individually recited herein. Finally, the operations of all methods described herein are performable in any suitable order unless otherwise indicated herein or otherwise clearly contradicted by the context. The use of any and all examples, or language indicating that an example is being described (e.g., "such as"), provided herein is intended merely to better illuminate the disclosure and does not pose a limitation on the scope of the disclosure unless otherwise claimed.

This specification has been set forth with various headings and subheadings. These are included to enhance readability and ease the process of finding and referencing material in the specification. These headings and subheadings are not intended, and should not be used, to affect the interpretation of the claims or limit their scope in any way. The particular implementations shown and described herein are illustrative examples of the disclosure and are not intended to otherwise limit the scope of the disclosure in any way.

All references, including publications, patent applications, and patents, cited herein are hereby incorporated by reference to the same extent as if each reference were individually and specifically indicated as incorporated by reference and were set forth in its entirety herein.

While the disclosure has been described in connection with certain embodiments and implementations, it is to be understood that the disclosure is not to be limited to the disclosed implementations but, on the contrary, is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method for allocating bitrate in video communications, comprising:
   encoding, via an encoder, a video stream that is partitioned into tiles associated with a viewing angle of the video stream, wherein encoding the video stream includes allocating each of the tiles a bitrate;
   determining an image quality score associated with rendering of the tiles at a first iteration, wherein rendering of the tiles includes decoding and displaying the tiles at the first iteration in the viewing angle of the video stream with the bitrate;
   determining an image quality gain that includes determining a change between the image quality score associated with the rendering of the tiles at the first iteration and an image quality score associated with the rendering of the tiles at a second iteration after the first iteration;
   determining whether the image quality gain surpasses an image quality gain threshold;
   responsive to determining that the image quality gain surpasses the image quality gain threshold, determining a time duration between the rendering of the tiles at the second iteration and rendering of the tiles at a third iteration after the second iteration that is greater than a time duration between the rendering of the tiles at the first iteration and the rendering of the tiles at the second iteration; and
   responsive to determining the image quality score, modifying the bitrate allocated to at least some of the tiles such that rendering of the tiles at a second iteration that is after the first iteration includes decoding and displaying the tiles with the modified bitrate.

2. The method of claim 1, wherein the modified bitrate varies between the tiles that are allocated the modified bitrate.

3. The method of claim 1, wherein determining the image quality score associated with the rendering of the tiles includes determining an average image quality score of the tiles at the first iteration, and modifying the bitrate allocated to at least some of the tiles includes modifying the bitrate allocated to at least some of the tiles such that an image quality score of each of the tiles with the modified bitrate converges towards the average image quality score.

4. The method of claim 1, further comprising:
responsive to determining that the image quality gain does not surpass the image quality gain threshold, determining the time duration between the rendering of the tiles at the second iteration and the rendering of the tiles at the third iteration that is equal to the time duration between the rendering of the tiles at the first iteration and the rendering of the tiles at the second iteration.

5. The method of claim 3, further comprising:
determining a bitrate allocation weight, wherein modifying the bitrate allocated to at least some of the tiles includes modifying the bitrate allocated to at least some of the tiles based on the bitrate allocation weight, wherein the greater a difference between an image quality score of the at least some of the tiles and the average image quality score, the greater a value of the bitrate allocation weight.

6. The method of claim 5, further comprising:
determining an average image quality score of the tiles at the second iteration;
determining a difference between the image quality scores of each of the tiles at the second iteration and the average image quality score; and
determining whether the difference in image quality scores of all of the tiles exceeds a quality margin threshold.

7. The method of claim 6, further comprising:
responsive to determining that the difference between the image quality score of at least one of the tiles at the second iteration and the average image quality score exceeds the quality margin threshold, modifying the bitrate of the at least one of the tiles at the second iteration.

8. A device for allocating bitrate in video communications, comprising:
a non-transitory memory; and
a processor configured execute instructions stored in the non-transitory memory to:
perform the method of claim 1.

9. The device of claim 8, wherein determining the image quality score associated with the rendering of the tiles includes determining an average image quality score of the tiles at the first iteration, and modifying the bitrate allocated to at least some of the tiles includes modifying the bitrate allocated to at least some of the tiles such that an image quality score of each of the tiles with the modified bitrate converges towards the average image quality score.

10. The device of claim 8, wherein the processor is further configured to execute instructions stored in the non-transitory memory to:
responsive to determining that the image quality gain does not surpass the image quality gain threshold, determining time duration between the rendering of the tiles at the second iteration and the rendering of the tiles at the third iteration that is equal to the time duration between the rendering of the tiles at the first iteration and the rendering of the tiles at the second iteration.

11. The device of claim 8, wherein the processor is further configured to execute instructions stored in the non-transitory memory to:
determine a bitrate allocation weight, wherein modifying the bitrate allocated to at least some of the tiles includes modifying the bitrate allocated to at least some of the tiles based on the bitrate allocation weight.

12. The device of claim 8, wherein the processor is further configured to execute instructions stored in the non-transitory memory to:
determine an average image quality score of the tiles at the second iteration;
determine a difference between the image quality score of each of the tiles at the second iteration and the average image quality score; and
determine whether the difference in image quality scores of all of the tiles exceeds a quality margin threshold.

13. A non-transitory computer-readable storage medium configured to store computer programs for allocating bitrate in video communications, the computer programs comprising instructions executable by a processor to:
perform the method of claim 1.

14. The non-transitory computer-readable storage medium of claim 13, wherein the modified bitrate varies between the tiles that are allocated the modified bitrate, determining the image quality score associated with the rendering of the tiles includes determining an average image quality score of the tiles at the first iteration, and modifying the bitrate allocated to at least some of the tiles includes modifying the bitrate allocated to at least some of the tiles such that an image quality score of each of the tiles with the modified bitrate converges towards the average image quality score.

15. The non-transitory computer-readable storage medium of claim 13, wherein the computer programs further comprise instructions executable by the processor to:
determine a bitrate allocation weight, wherein modifying the bitrate allocated to at least some of the tiles includes modifying the bitrate allocated to at least some of the tiles based on the bitrate allocation weight.

16. A method for allocating bitrate in video communications, comprising:
encoding, by a sending device, a first frame of a video stream associated with a viewing angle, the video stream associated with the viewing angle partitioned into tiles, wherein each of the tiles is allocated an initial bitrate from a total bitrate quota associated with the video stream;
receiving, by the sending device from a receiving device, image quality information associated with rendering of at least some of the tiles of the first frame at the receiving device, wherein rendering of a tile of the first frame comprises at least one of decoding or displaying the tile with the initial bitrate;
determining, by the sending device at a first iteration, an image quality score for each of the at least some of the tiles of the first frame in response to receiving the image quality information associated with rendering of at least some of the tiles of the first frame at the receiving device, wherein the image quality score is determined based on the image quality information; and
responsive to determining the image quality score of each of the at least some of the tiles of the first frame, determining, at a second iteration, a modified bitrate allocated from the total bitrate quota to at least some of the tiles of a second frame of the video stream, such that rendering of the at least some of the tiles of the second frame comprises at least one of decoding or displaying the at least some of the tiles of the second frame at the receiving device with the modified bitrate.

17. The method of claim 16, wherein the image quality score for each of the at least some of the tiles of the second frame is caused to converge toward an average image quality score of the tiles.

18. The method of claim 17, further comprising:
determining a bitrate allocation weight; and
wherein determining the modified bitrate allocated to the at least some of the tiles of the second frame comprises:
modifying the bitrate allocated to the at least some of the tiles based on the bitrate allocation weight, wherein a greater difference between an image quality score of the at least some of the tiles and the average image quality score corresponds to a greater value of the bitrate allocation weight.

19. The method of claim 16, wherein the first iteration is associated with a bitrate iteration mode, and the second iteration is associated with an image quality monitoring mode, and the encoder is caused to switch between the bitrate iteration mode and the image quality monitoring mode iteratively.

20. The method of claim 19, wherein the encoder is caused to switch between the bitrate iteration mode and the image quality monitoring mode based on an image quality gain between the image quality score determined at the first iteration and an image quality score determined based on image quality information associated with rendering of the at least some of the tiles of the second frame at the receiving device, wherein rendering of a tile of the second frame comprises at least one of decoding or displaying the tile with the modified bitrate.

\* \* \* \* \*